Oct. 15, 1946.    Y. Z. VON STACKELBERG    2,409,335
HYDRAULIC BRAKE SYSTEM
Filed Nov. 22, 1944
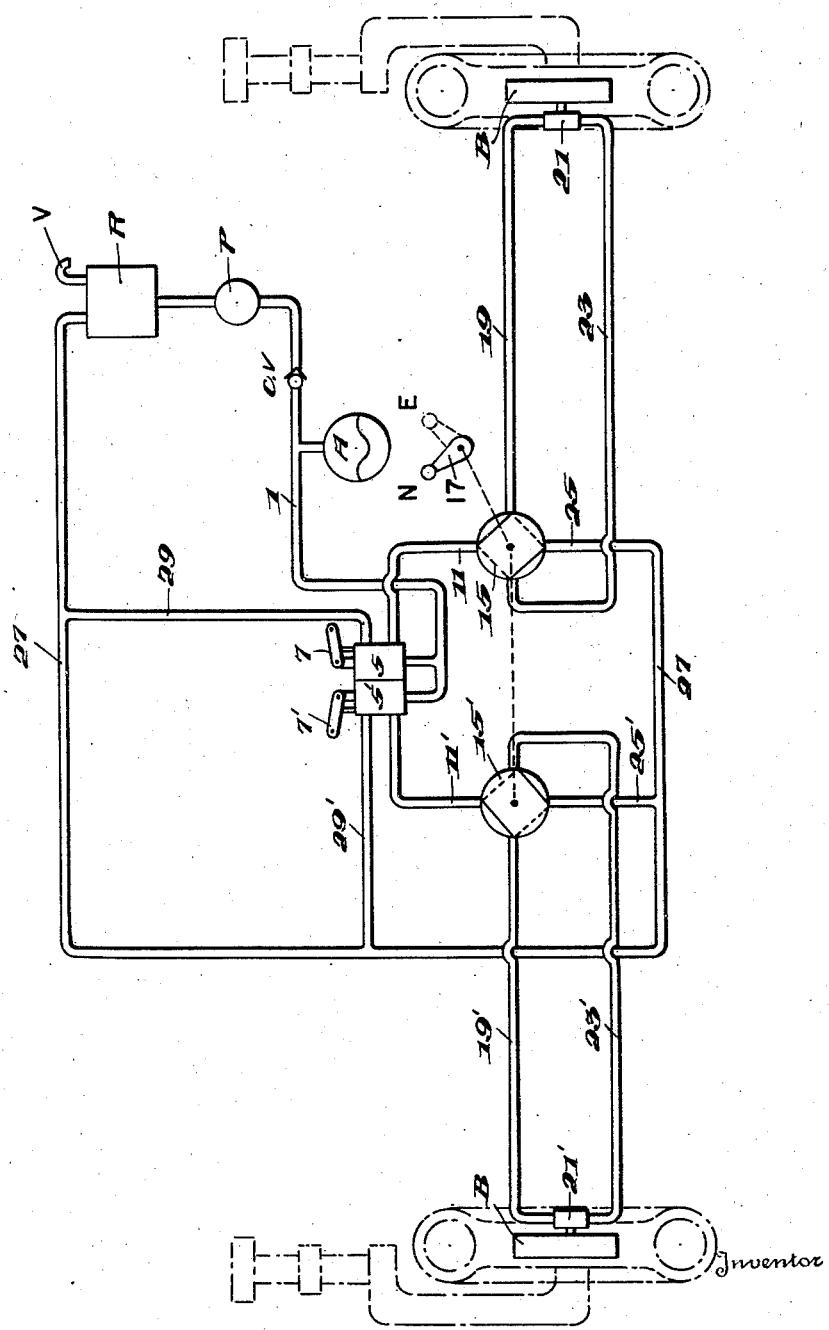
Yurgen Z. von Stackelberg
By Donald W. Farrington
Attorney Patented Oct. 15, 1946

2,409,335

UNITED STATES PATENT OFFICE 2,409,335

HYDRAULIC BRAKE SYSTEM

Yurgen Z. von Stackelberg, Baltimore, Md., assignor to The Glenn L. Martin Company, Middle River, Md., a corporation of Maryland Application November 22, 1944, Serial No. 564,594

11 Claims. (Cl. 188—152)

This invention relates to a hydraulic braking system, particularly for aircraft, and its prime object is to provide a hydraulic braking system including an emergency fluid system whereby the brakes may be operated in the event the fluid pressure pump fails or where the normal fluid line conveying fluid to the brakes has been ruptured.

It is more or less conventional in aircraft braking systems to energize the wheel brakes by utilizing a fluid pressure system comprising a fluid reservoir and pump connected thereto for forcing fluid under pressure to foot-controlled valves which are attached to the right and left rudder pedals of an aircraft for operation by the pilot, with the fluid under pressure controlled thereby communicating with the wheel brakes for applying actuating pressure thereto. It is obvious that the fluid pressure lines leading from the foot-controlled brakes on the rudder pedal to the wheel brakes are quite vulnerable and that if these lines rupture there would be no pressure available for actuating the brakes. Furthermore, this dangerous condition may occur if the pressure pump develops any mechanical difficulty and fails to maintain the necessary fluid pressure in the operating lines.

It is usual to carry a compressed air bottle having a manually controlled valve thereon and a separate air circuit to the brakes through shuttle valves located adjacent the brakes whereby if the normal fluid line lacks sufficient pressure to operate the brakes, the air bottles may be opened to shift the shuttle valves and close off fluid therethrough and to permit air from the compressed supply to energize the brakes. However, this type of emergency brake operator has several inherent disadvantages inasmuch as the air bottle permits only a single operation of the brakes, and more important, after the emergency operation, the entire hydraulic system is contaminated with air and it is then necessary to disconnect and purge the whole braking system before normal fluid operation can again be effected. The use of compressed air in the brakes, because there is no control over its application to the brakes, locks the aircraft wheels and in most cases causes the tires to be ruined in arresting the plane. As before stated, the greatest disadvantage in such an emergency air system is that the whole system must be bled of the air before repairs can be made and the hydraulic fluid system fails because of the non-operation of the fluid pump, such a minor mechanical failure requires a major overhaul of the system because of the air in the systems.

In the present invention, the hydraulic braking system includes a closed, normal fluid system for the brakes, comprising a fluid reservoir and pump, foot control valves attached to the rudder pedals for passing fluid to the wheel brakes, and a pair of four-way valves inserted in the fluid lines leading from the foot operated brakes, whereby fluid under pressure is normally passed therethrough to the brakes. A vent line is provided from shuttle valves on the brakes back through the four-way valves and thence to a common discharge line, which is connected to the reservoir. A hydraulic fluid accumulator of any accepted design is placed in the fluid line between the pump and the foot operated valves, with a check valve interposed in the fluid line between the pump and the accumulator. With this arrangement, the accumulator is kept under full pressure at all times and acts as a pressure equalizer on the line. Upon failure of the pump, the check valve operates to prevent escape of fluid from the accumulator back through the pump, and the pressure is maintained at the brake valves by the accumulator.

A shuttle valve similar to that illustrated in Overbeke Patent No. 2,300,694, dated October 3, 1942, is placed on each brake. The valve forms a fitting to which the normal pressure line and the vent line which also forms the emergency fluid pressure line, are connected. The four-way valves controlling the normal and emergency conduits are preferably made in a single unit and are manually operated by the pilot when the "feel" of the pedal valves controlling the regular brake lines indicates there is insufficient fluid pressure to operate the brakes. By merely flipping a lever, the plugs of the four-way valves shift the fluid pressure from the control valves, from the normal line, into the emergency line through the shuttle valves. It will be apparent that when the normal fluid lines are used, the emergency lines act as vents therefor and conversely when the emergency lines are used the normal lines act as a vent, and this venting operation and use of shuttle valves positively prevents any hydraulic lock in the system. Furthermore, there is a great advantage attendant to the use of this type of hydraulic system over the air bottle heretofore proposed, as no air is admitted into the fluid system. The check valve referred to prevents any recession of fluid from the accumulator either by failure of the pump or rupture of the normal fluid pressure lines leading from the foot brakes to the wheel brakes.

The attached drawing is a diagrammatical layout of a fluid system embodying the principles of this invention, but it will be obvious that these principles can be incorporated in fluid braking systems of other design. Specifically the normal fluid circuit extends from the fluid reservoir R having a vent V through pump P and check valve CV to accumulator A and through main fluid line 1 to foot operated valves 5 and 5' which may be attached to the rudder pedals of the aircraft and operated by linkages 7 and 7', respectively. As shown, the main fluid line 1 is branched into the casings of brake pedal valves 5 and 5', and these valves may be individually vented through vent lines 29, 29' to main return line 27. The four-way valves 15, 15' receive fluid through lines 11, 11' connected to the foot-operated valves 5 and 5'. In the position shown, the plugs of the four-way valves pass fluid to the normal brake operating conduits 19, 19' through shuttle valves 21, 21' to the wheel brake B. Vent lines are provided via the four-way valves through emergency lines 23, 23' through the passages of valves 15, 15' and vent line 27 connected to the top of reservoir R.

If the pump P fails or if the normal fluid lines 19, 19' are shot away the pilot operates lever 17 and moves it from the normal to emergency position indicated by the letters N and E to rotate the plugs of the four-way valves 15, 15' whereby the fluid circuit permits fluids from the evercharged accumulator A to pass through line 1, valves 5 and 5' as in normal operation, and thence to emergency lines 23, 23' and through the shuttle valves to the brakes. The normal lines 19, 19' then vent the shuttle valves and prevent any hydraulic lock from occurring. It is preferable to vent the foot-operated valves 5 and 5' independently, and this is shown by lines 29, 29' joined to the main return line 27.

As before indicated, the accumulator contains sufficient fluid pressure to operate the brakes a number of times, and by reason of the check valve CV the accumulator is constantly charged and available for instant use. When lines 19, 19' are shot away, the fluid escapes therefrom and the system does not become pressure locked.

The mechanism described affords an alternate fluid pressure source that operates the brakes in the same manner and with the same "feel," after lever 17 has been moved from the normal to the emergency position.

It is to be understood that certain changes, alterations, modifications and substitutions can be made without departing from the spirit and scope of the appended claims.

I claim as my invention:

1. A hydraulic brake system comprising a reservoir, a pump to deliver fluid under pressure from the reservoir to a fluid line, and a brake, a pressure control valve in said fluid line controlling the flow of fluid to said brake, said fluid line extending from said pressure control valve to said brake including a flow control valve connected to receive fluid under pressure from the outlet of said pressure control valve and a shuttle valve on said brake, a pair of fluid lines extending from said flow control valve to the inlet ports of said shuttle valves, one of said lines constituting the normal pressure line and the other an emergency pressure line, said flow control valve adapted to direct fluid through either the normal or emergency pressure line, the other line affording a vent for said shuttle valve through said flow control valve.

2. A hydraulic brake system comprising a reservoir, a pump, a pressure control valve, a fluid line and a brake, interconnected to cooperate to deliver fluid under controlled pressure to said brake, an accumulator connected to said line between said pump and said control valve to equalize the pressure in said line, said fluid line extending from said pressure control valve to said brake including a manually operated flow control valve connected to receive fluid under pressure from the outlet of said pressure control valve, a shuttle valve mounted on said brake, a pair of fluid lines extending from said flow control valve to the inlet ports of said shuttle valves, said manually operated valve so connected that fluid under pressure may be directed through one or the other of the brake lines to said shuttle valve, the line through which fluid pressure is not directed affords a vent for said shuttle valve through said flow control valve.

3. A hydraulic braking system for vehicles comprising a brake, a reservoir, a pump having the inlet side connected to said reservoir, an energizer-accumulator connected to the line on the outlet side of the pump, a check valve between the inlet to the accumulator and said pump, a pressure control valve in said line controlling the pressure of fluid through the brake line to the brake, said brake line including a flow control valve, a shuttle valve mounted on said brake and a pair of conduits extending from said flow control valve to the inlet ports of said shuttle valve, said flow control valve connected to said pressure control valve to receive fluid therefrom and direct it through either of said pair of lines to said shuttle valve, the other line affording a vent for said shuttle valve through said flow control valve.

4. A hydraulic braking system for vehicles comprising a fluid circuit including a reservoir, a pump for maintaining the fluid in the circuit under pressure, a brake, an accumulator secured to the line on the outlet side of the pump acting as a pressure equalizer, means to prevent flow of fluid from said accumulator through said pump, a pressure control valve for controlling the flow of fluid to said brake on the vehicle, a normal fluid pressure line extending from said pressure control valve to said brake, a second pressure line extending from said pressure control valve to said brake, a manually operable flow control valve means interposed between said pressure control valve and said brake for directing fluid under pressure through either the normal line or the secondary line.

5. A hydraulic braking system including a plurality of brakes, a fluid reservoir, a pump and fluid pressure lines each having a pressure control valve for delivering fluid under controlled pressures from the pump to each brake, an accumulator interposed in the system between the pump and the pressure control valve to equalize the pressure in the system and a manually operated flow control valve in said system for directing fluid under pressure from each of said pressure control valves to said brakes through one or the other of separate fluid pressure lines.

6. A hydraulic brake system comprising a reservoir, a pump to deliver fluid under pressure from the reservoir to a fluid line, and a brake, a pressure control valve in said fluid line controlling the flow of fluid to said brake, said fluid line extending from said pressure control valve to said brake including a flow control valve connected to receive fluid under pressure from the outlet of said pressure control valve and a shuttle valve on said brake, a pair of fluid lines extending from said flow control valve to the inlet ports of said shuttle valves, one of said lines constituting the normal pressure line and the other an emergency pressure line, said flow control valve being a manually operable valve to selectively direct fluid through either the normal or emergency pressure line, the other line affording a vent for said shuttle valve through said flow control valve.

7. A hydraulic brake system comprising a reservoir, a pump, a pressure control valve, a fluid line and a brake, interconnected to cooperate to deliver fluid under controlled pressure to said brake, said fluid line extending from said pressure control valve to said brake including a flow control valve connected to receive fluid under pressure from the outlet of said pressure control valve, a shuttle valve mounted on said brake, a pair of fluid lines extending from said flow control valve to the inlet ports of said shuttle valves, said flow control valve so connected that fluid under pressure may be directed through one or the other of the brake lines to said shuttle valve, the other line affording a vent for said shuttle valve through said flow control valve.

8. A hydraulic braking system for vehicles comprising a reservoir, a pump having the inlet side connected to said reservoir, an equalizer-accumulator connected to the line on the outlet side of the pump, a check valve between the inlet to the accumulator and said pump, a pressure control valve in each line controlling the pressure of fluid through brake lines to brakes, each of said brake lines including a flow control valve, a shuttle valve mounted on said brake and a pair of conduits extending from said flow control valve to the inlet ports of said shuttle valve, said flow control valve connected to said pressure control valve to receive fluid therefrom and direct it through either of said pair of lines to said shuttle valve, the other line affording a vent for said shuttle valve through said flow control valve.

9. A hydraulic braking system for vehicles comprising a reservoir, a pump for maintaining fluid in the system under pressure, conduits extending from said pump to deliver fluid under pressure to the brakes of said vehicle; pressure control valves in said conduits between said pump and said brake and an accumulator connected to the line between the pressure control valves and the pump a check valve between said accumulator and said pump, said accumulator acting to equalize the pressure in the system maintained by said pump and act as an emergency source of pressure upon failure of the pump.

10. A hydraulic brake system comprising a reservoir, a pump to deliver fluid under pressure from the reservoir to a fluid line, and a brake, a pressure control valve in said fluid line controlling the flow of fluid to said brake, said fluid line extending from said pressure control valve to said brake including a flow control valve connected to receive fluid under pressure from the outlet of said pressure control valve and a shuttle valve on said brake, a pair of fluid lines extending from said flow control valve to the inlet ports of said shuttle valves, one of said lines constituting the normal pressure line and the other an emergency pressure line, said flow control valve adapted to direct fluid through either the normal or emergency pressure line, said lines being so connected that one will serve as a vent line for one side of the shuttle valve when the other line conducts fluid under pressure to the other side of said shuttle valve.

11. A hydraulic brake system comprising a reservoir, a pump to deliver fluid under pressure from the reservoir to a fluid line, and a brake, a pressure control valve in said fluid line controlling the flow of fluid to said brake, said fluid line extending from said pressure control valve to said brake including a flow control valve connected to receive fluid under pressure from the outlet of said pressure control valve and a shuttle valve on said brake, a pair of fluid lines extending from said flow control valve to the inlet ports of said shuttle valves, one of said lines constituting the normal pressure line and the other an emergency pressure line, said flow control valve adapted to direct fluid through either the normal or emergency pressure line, said line being connected through the flow control valve so that when one line conducts fluid under pressure to one inlet port of the shuttle valve, the other line serves as a vent line from the other port of said shuttle valve through the flow control valve.

YURGEN Z. von STACKELBERG.